United States Patent
Spink et al.

(10) Patent No.: US 7,107,971 B2
(45) Date of Patent: Sep. 19, 2006

(54) ISOLATION VALVE USEFUL IN FUEL TANK EMISSION CONTROL SYSTEMS

(75) Inventors: Kenneth M. Spink, Jerome, MI (US); Andrew W. McIntosh, Ann Arbor, MI (US); Robert P. Benjey, Dexter, MI (US); Charles J. Martin, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 135 days.

(21) Appl. No.: 10/966,437

(22) Filed: Oct. 15, 2004

(65) Prior Publication Data

US 2006/0081224 A1    Apr. 20, 2006

(51) Int. Cl.
*F02M 37/04*    (2006.01)
(52) U.S. Cl. .................... 123/520; 123/518
(58) Field of Classification Search ........... 123/516, 123/518, 519, 520
See application file for complete search history.

(56) References Cited

U.S. PATENT DOCUMENTS

| | | | | |
|---|---|---|---|---|
| 3,683,597 | A | * | 8/1972 | Beveridge et al. ........... 123/519 |
| 4,040,404 | A | * | 8/1977 | Tagawa ........................ 123/519 |
| 4,153,025 | A | * | 5/1979 | Thornburgh ................. 123/520 |
| 4,343,281 | A | * | 8/1982 | Uozumi et al. ............. 123/519 |
| 4,703,737 | A | * | 11/1987 | Cook et al. .................. 123/520 |
| 4,714,172 | A | | 12/1987 | Morris |
| 5,111,795 | A | | 5/1992 | Thompson |
| 5,181,497 | A | * | 1/1993 | Matsushita et al. .......... 123/520 |
| 5,318,069 | A | | 6/1994 | Harris et al. |
| 5,640,993 | A | | 6/1997 | Kasugai et al. |
| 6,062,276 | A | | 5/2000 | Benjey et al. |
| 6,276,193 | B1 | | 8/2001 | Benjey |
| 6,484,741 | B1 | | 11/2002 | Benjey et al. |
| 6,553,975 | B1 | | 4/2003 | Weldon et al. |
| 6,637,261 | B1 | | 10/2003 | Beneker |
| 6,655,403 | B1 | | 12/2003 | Mills |
| 6,668,807 | B1 | | 12/2003 | Weldon et al. |

FOREIGN PATENT DOCUMENTS

| | | |
|---|---|---|
| EP | 0 628 440 A1 | 12/1994 |
| EP | 0 790 144 A3 | 8/1997 |
| GB | 1 546 738 | 5/1979 |

* cited by examiner

*Primary Examiner*—Thomas Moulis
(74) *Attorney, Agent, or Firm*—Jaquez & Associates; Martin J. Jaquez, Esq.; Lisa M. Griffith, Esq.

(57) ABSTRACT

Isolation valves of the invention are advantageously mechanically actuated. Such valves and associated methods comprise a first port in fluid communication with a first component; a second port in fluid communication with a second component; a third port in fluid communication with a third component; a diaphragm disposed within the valve for closing a normally open internal pathway to occlude fluid communication between the first port and the second port in response to a pressure differential across the diaphragm; and a flow sensitive pressure device for controlling the pressure differential across the diaphragm. Fluid flows from the second component to the third component upon closing of the normally open internal pathway. In an exemplary embodiment, isolation valves and methods of the invention are adapted for use in fuel tank emission control systems.

35 Claims, 8 Drawing Sheets

FIG. 1

PRIOR ART

FIG. 3H

ISOLATION VALVE USEFUL IN FUEL TANK EMISSION CONTROL SYSTEMS

BACKGROUND

The present invention relates to an isolation valve useful in, among other things, fuel tank emission control systems.

Fuel vapor emission control systems are becoming increasingly more complex, in large part in order to comply with environmental and safety regulations imposed on manufacturers of gasoline-powered vehicles, particularly light passenger trucks and cars. Along with the ensuing overall system complexity, complexity of individual components within has also increased.

Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle.

During purges, all vapor pathways are open to a canister where hydrocarbon vapors are stored. Pressure or flow fluctuations can negatively impact efficiency, effectiveness, and exhaust emissions of an engine during operation based on the impact that such pathways have on purging. In order to remove any such effects, some of which are undesirable, imposed by an open vapor pathway to a fuel tank when purging an adjacent canister, fuel tank isolation valves have been used.

Certain mechanically actuated (e.g. in response to pneumatic pressure) valves are known. For example, see U.S. Pat. No. 4,714,172. However, current trends in fuel tank emission control systems tend to include electronically actuated valves. U.S. Pat. No. 6,668,807 describes a fuel vapor emission control system employing a fuel tank isolation valve. The fuel tank isolation valve is electronically actuated. Electrically actuated valves were purportedly developed to overcome disadvantages known to be associated with conventional diaphragm-actuated valves. Thus, present fuel tank emission control systems rely heavily on electrically actuated valves. For example, see the discussion of electrically actuated valves in U.S. Pat. No. 6,553,975. U.S. Pat. No. 6,637,261 discusses further electrically actuated valves used in fuel tank emission control systems.

A wide variety of components can be joined to form a workable fuel tank emission control system. One conventional fuel tank emission control system is illustrated in prior art FIG. 1. The fuel tank emission control system includes a hydrocarbon storage device (i.e., canister) 1 connected to receive hydrocarbon fuel vapor directly from the fuel tank 2 via an unobstructed pathway, with the canister 1 having an atmospheric purge valve 3 that may be opened or closed by a control valve 4 connected to an electronic control unit (ECU) 5. The fuel tank 2 has a tank pressure sensor 6 connected to sense the internal pressure in the tank 2 and provide an associated electrical input to the ECU 5 based thereupon.

Figure 1:
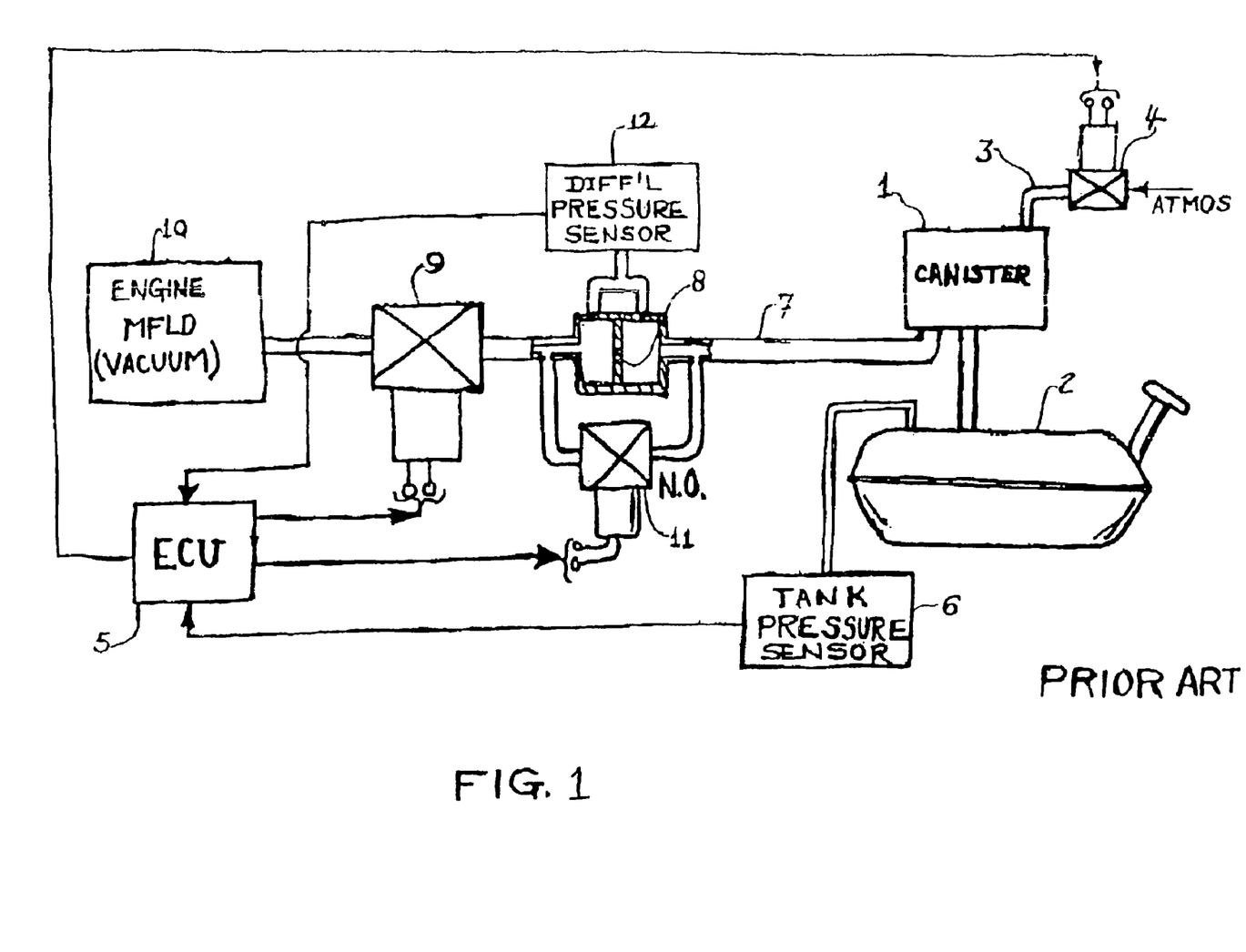
FIG. 1 is a pictorial schematic of a prior art fuel vapor emission control system.

The canister 1 has a vapor outlet line 7 connected to provide hydrocarbon vapor flow for internal combustion in an engine downstream. Hydrocarbon vapor flows via vapor outlet line 7 from canister 1 through a control orifice 8, with the downstream side of orifice 8 being connected to the inlet of an engine purge control valve 9 having its outlet connected to the combustion air inlet or intake manifold of an engine 10. Engine purge control valve 9 is an electrically actuated valve controlled by the ECU 5.

An electronically actuated, normally open valve 11 is connected to bypass the control orifice 8 and is also controlled by the ECU 5. A differential pressure sensor 12 is connected to sense the pressure drop across the control orifice 8 and provide an associated electrical input signal to the ECU 5.

Recent innovations in fuel tank emission control systems, including transformation of valves therein from mechanical to electrical actuation, have not always resulted in overall system advantages. For example, as more and more components within vehicles are designed to be electronically controlled, the overall cost of the vehicle has increased. Further, the great reliance placed on use of electrical components for performing individual functions is predicated on proper functioning of electrical systems. A small interruption in the electrical system can thus have widespread impact throughout the overall operating system of a vehicle. When the interruption affects proper opening and closing of fuel tank isolation valves therein, the impact can even spread so far as to cause undesirable or even unlawful release of contaminants into the environment or result in mechanical failure of an associated engine. Improved fuel tank isolation valves are thus desired.

SUMMARY

Isolation valves of the invention offer advantages when used in not only fuel tank emission control systems, but other systems where similarly operating valves are desirable. Because isolation valves of the invention are advantageously mechanically actuated, they are not dependent on reliable operation of electronic components therein.

Further, design and construction of isolation valves of the invention provides significant cost savings and weight reduction, beneficial properties when used in many applications. In one exemplary embodiment, isolation valves of the invention are capable of providing essentially the same function whether they are positioned upright or sideways within a larger assembly. Thus, overall design freedom is expanded when using such isolation valves.

In general, isolation valves of the invention comprise a first port in fluid communication with a first component (e.g., a fuel tank); a second port in fluid communication with a second component (e.g., a canister for storage of hydrocarbon vapor); a third port in fluid communication with a third component (e.g., an engine purge control valve); a diaphragm disposed within the valve for closing a normally open internal pathway to occlude fluid communication between the first port and the second port in response to a pressure differential across the diaphragm; and a flow sensitive pressure device (e.g., head valve) for controlling the pressure differential across the diaphragm. According to this arrangement, fluid flows from the second component to the third component upon closing of the normally open internal pathway. In particular embodiments, essentially the same pressure differential is maintained across the diaphragm irrespective of rate of fluid flow from the second component to the third component. In a more particular embodiment, fluid flow between the first component and the third component is prevented upon closing of the normally open internal pathway so long as pressure within the first component is less than the pressure differential across the diaphragm.

Amount of movement of the diaphragm with such isolation valves can vary depending on the overall system design. In one exemplary embodiment, however, during operation the diaphragm closes the normally open internal pathway by moving longitudinally in a first direction by approximately ³⁄₁₆ inch.

In one embodiment, the pressure differential across the diaphragm is controlled to a relatively constant level of approximately two to approximately four inches of atmospheric water pressure with increasing fluid flow from the second component to the third component after closing of the normally open internal pathway. For example, fluid flow from the second component to the third component can occur at a rate of up to approximately 100 lpm.

In a further embodiment, isolation valves of the invention also comprise an overpressure relief ring as well as an associated overpressure relief spring. These components facilitate adequate venting of excess pressure from the first component when the internal pathway is open or closed. In certain variations, pressure within the first component is maintained at a level of approximately ten inches atmospheric water pressure or less. According to an exemplary embodiment, when fluid flows from the second component to the third component upon closing of the normally open internal pathway, relief pressure associated with the first component is essentially the same irrespective of rate the fluid flow from the second component to the third component.

In an exemplary embodiment, isolation valves of the invention are adapted for use in fuel tank emission control systems, where the fluid flow regulated by the isolation valves generally comprises fuel. Such fuel tank emission control systems are beneficially employed in, for example, gasoline-powered vehicles such as passenger cars and light passenger trucks. In this embodiment, an isolation valve is fluidly coupled between a fuel tank, canister, and engine purge control valve therein. During operation, the fuel tank isolation valve is capable of purging a hydrocarbon canister in a fuel tank emission control system while simultaneously isolating a fuel tank fluidly coupled thereto without reliance on reliable operation of electronic components therein. In this manner, combustible hydrocarbon vapors within are pulled from the canister at a faster and more controlled rate, as fuel vapor is not simultaneously being pulled from the fuel tank.

DETAILED DESCRIPTION

The invention provides an efficient and effective mechanically actuated isolation valve. Isolation valves of the invention are particularly useful in fuel tank emission control systems. According to an exemplary embodiment of the invention, diaphragm-actuated isolation valves of the invention can be used in fuel tank emission control systems (in which they are termed "fuel tank isolation valves") for purging of a hydrocarbon canister in an engine while simultaneously isolating a fuel tank fluidly coupled thereto.

Note that use of the terms "fluidly," "fluid," and similar variations throughout, can refer to a gaseous phase, a liquid phase, or a mixture of gaseous and liquid phases. In many embodiments, the terms refer to the gaseous phase of a volatile liquid fuel (e.g., hydrocarbon fuel vapor).

Isolating a fuel tank from a canister (and thus an associated engine) according to an exemplary embodiment of the invention allows for efficient and effective purging of the canister within the fuel tank emission control system. With such isolation during purges, combustible hydrocarbon vapors within are pulled from the canister at a faster and more controlled rate, as fuel vapor is not simultaneously being pulled from the fuel tank. Further, as compared to use of typically more expensive electrically actuated valves known in the art, the invention provides not only a significant cost-savings, but also a system relying on valves that are not dependent on reliable operation of electronic components therein. In this manner, mechanically actuated isolation valves of the invention operate reliably without negative effects often associated with electrical interruptions or faults.

Figure 2:
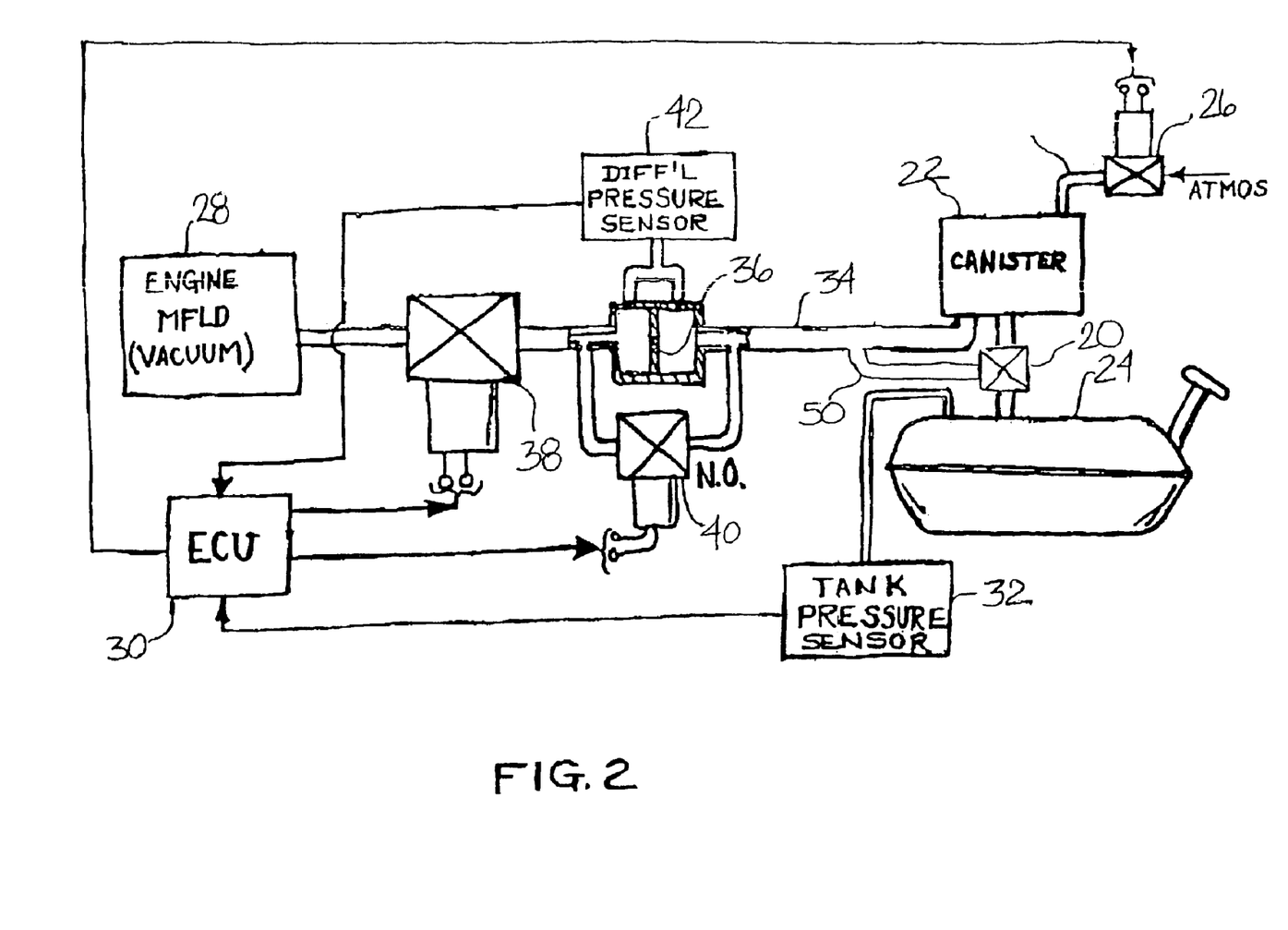
FIG. 2 is a pictorial schematic of a fuel vapor emission control system employing a fuel tank isolation valve according to the invention.

Referring to FIG. 2, a fuel tank isolation valve 20 of the invention is fluidly coupled between canister 22, fuel tank 24, and atmospheric purge valve 26 in one embodiment of a fuel tank emission control system of the invention. Fuel tank isolation valve 20 operates to open and close the vapor pathway between canister 22 and fuel tank 24 during purging of canister 22 and conveyance of stored hydrocarbon vapors therein via an engine intake manifold vacuum 28 to engine (not shown) for internal combustion. Other conventional fuel tank emission control system components, such as engine control unit (ECU) 30, tank pressure sensor 32, and vapor outlet line 34, which is connected to provide vapor flow from canister 22 through a control orifice 36 to engine purge control valve 38, may also be present in the overall system. Such an embodiment is illustrated in FIG. 2, which accordingly has similarities with the fuel tank emission control system illustrated in prior art FIG. 1. Further in the embodiment illustrated in FIG. 2, a normally open valve 40 bypasses control orifice 36. Normally open valve 40 operates based upon electrical signals generated from differential pressure sensor 42 output. Differential pressure sensor 42 is connected to sense pressure drop across the control orifice 36 and provide an associated electrical input signal to the ECU 30.

Fuel tank isolation valves of the invention are sensitive to and operate based on pressure differentials associated with purge flow during purge events associated with delivery of stored hydrocarbon vapors to an associated internal combustion engine. The nature and timing of purge flow, as known to those skilled in the art, is generally controlled based on interaction of several conventional components. In a typical embodiment, nature and timing of purge flow is determined based on the engine's capabilities and the nature and amount of the combustible hydrocarbon vapors within canister 22. Any suitable components can be used for purging of canister 22. While fuel tank isolation valves of the invention are mechanical in nature, other components within the system may be of any suitable nature—e.g., electrical, mechanical, or otherwise. For example, such components can include an electronically actuated (e.g., solenoid) valve, such as engine purge control valve 38 of FIG. 2.

In the embodiment shown in FIG. 2, solenoid engine purge control valve 38 operates in conjunction with fuel tank isolation valves of the invention in a fuel tank emission control system. Solenoid engine purge control valve 38 operates to effect purging of hydrocarbon vapors that have collected in canister 22 from fuel tank 24. The hydrocarbon vapors so purged are then transported for internal combustion to an operatively coupled engine (not shown).

A wide variety of solenoid valves are suitable for this purpose. For example, one suitable solenoid engine purge control valve includes a housing having an inlet port and an outlet port. The inlet port is in fluid communication via a pathway with a purge port on canister 22, in the manner illustrated in FIG. 2. The outlet port is in fluid communication via a pathway with engine intake manifold vacuum 28 and engine.

Further within the exemplified solenoid engine purge control valve 38 is an operating mechanism disposed within the housing for opening and closing an internal passage that provides fluid communication between the inlet port and the outlet port. The mechanism includes a spring that biases a valve element to a normally closed arrangement (i.e., so as to occlude the internal passage between the inlet port and the outlet port). When the operating mechanism (e.g. a solenoid) is energized by an engine purge control valve signal from ECU 30, an armature opposes the spring to open the internal passage so that flow can occur between the inlet port and the outlet port.

Note that throughout systems and components of the invention, referenced pathways may include optional components known to those skilled in the art so long as they do not substantially interfere with the intended function of the system or component. For example, a wide variety of pressure sensors, valves, and orifices may be positioned within such pathways.

In an exemplary embodiment, it is advantageous to provide only one additional valve within a pathway between the inlet port of an engine purge control valve and a fuel tank relative to number of valves within a pathway between the inlet port of the engine purge control valve and a canister within a fuel tank emission control system of the invention. This provides overall design simplicity and minimizes need for installation and maintenance of additional components.

With further reference to FIG. 2, fuel tank isolation valve 20 is connected in series between fuel tank 24 (generally from the gaseous vapor dome or headspace portion of the fuel tank) and canister 22 via a series of valve ports. While isolation valves of the invention can be used in systems other than fuel tank emission control systems (i.e., isolation valves of the invention can be used wherever a similarly operating valve is desirable), for ease of understanding isolation valves of the invention will be described in an exemplary embodiment as fuel tank isolation valves with reference to their use in fuel tank emission control systems. In that regard, components illustrated in the fuel tank emission control system of FIG. 2 will be further referenced in relation to FIGS. 3A–3H discussed below.

Figure 3A:
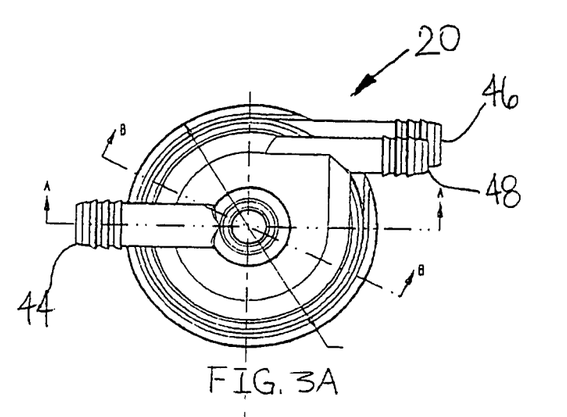
FIG. 3A is a top view of a fuel tank isolation valve of the invention.
Figure 3B:
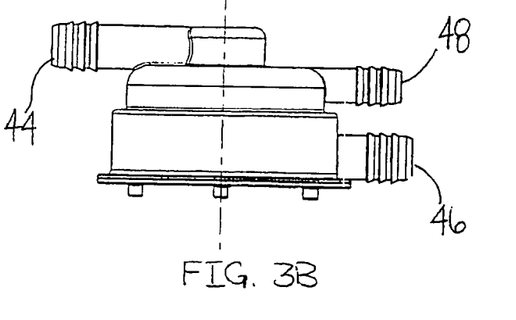
FIG. 3B is a side view of the fuel tank isolation valve of FIG. 3A when viewed from a side parallel to sectional axis A—A.
Figure 3C:
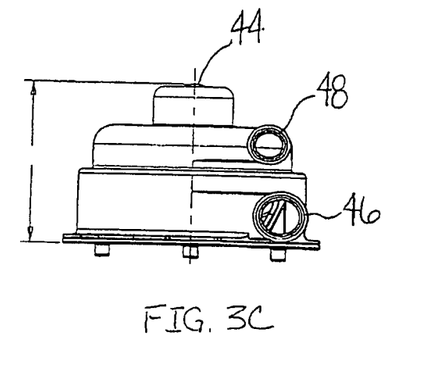
FIG. 3C is a side view of the fuel tank isolation valve of FIG. 3A when viewed from a side perpendicular to sectional axis A—A.

In that regard, as shown particularly in FIGS. 3A–3C, fuel tank isolation valve 20 of the invention includes first port 44 for connection of a pathway from a first component, e.g., fuel tank 24, to fuel tank isolation valve 20. Second port 46, for connection of a pathway from a second component, e.g., canister 22 for storage of hydrocarbon vapor, to fuel tank isolation valve 20, is also included. Further, third port 48, for connection of pathway 50 (shown in FIG. 2) from a third component, e.g., engine purge control valve 38, to fuel tank isolation valve 20, is also included therein.

Figure 3D:
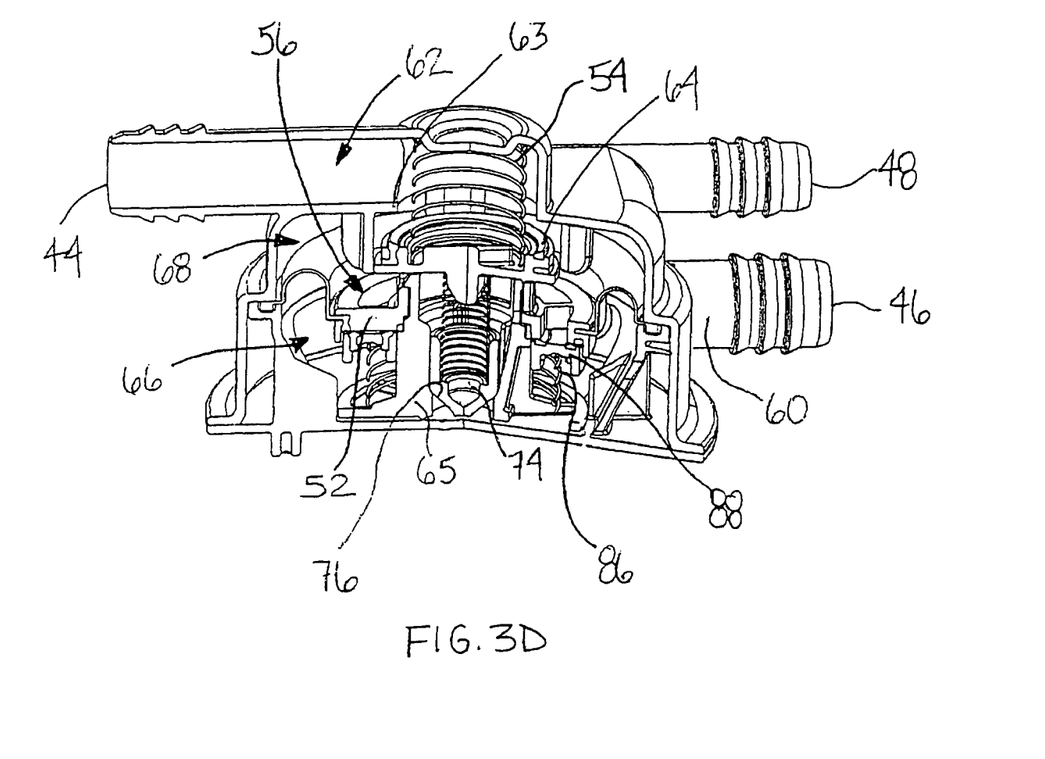
FIG. 3D is a partial cut away side view of the fuel tank isolation valve of FIGS. 3A and 3B.
Figure 3E:
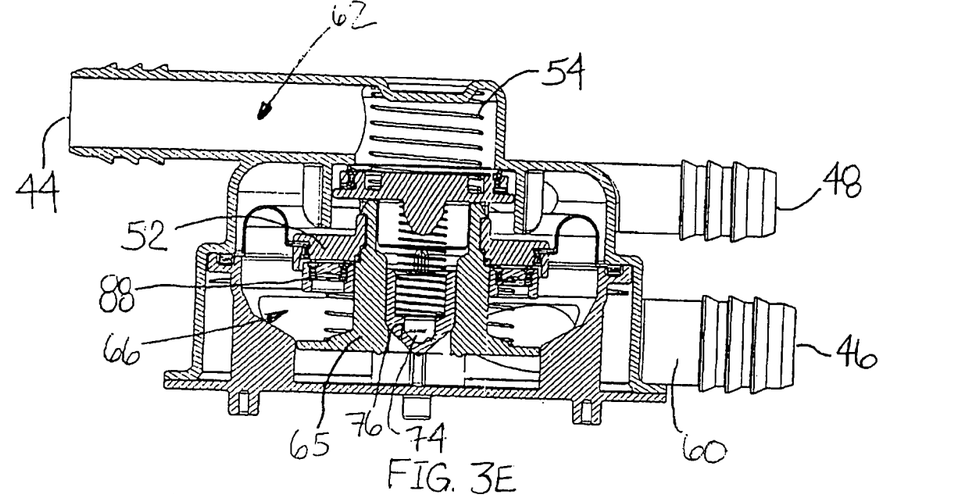
FIG. 3E is a partial cut away side sectional view along sectional axis A—A of the fuel tank isolation valve of FIG. 3A in a closed position.
Figure 3F:
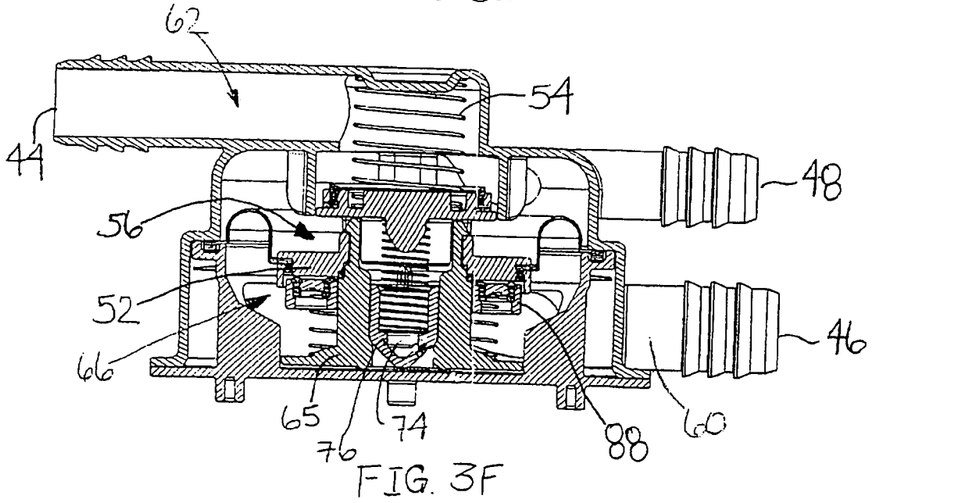
FIG. 3F is a partial cut away side sectional view along sectional axis A—A of the fuel tank isolation valve of FIG. 3A in an open position.
Figure 3G:
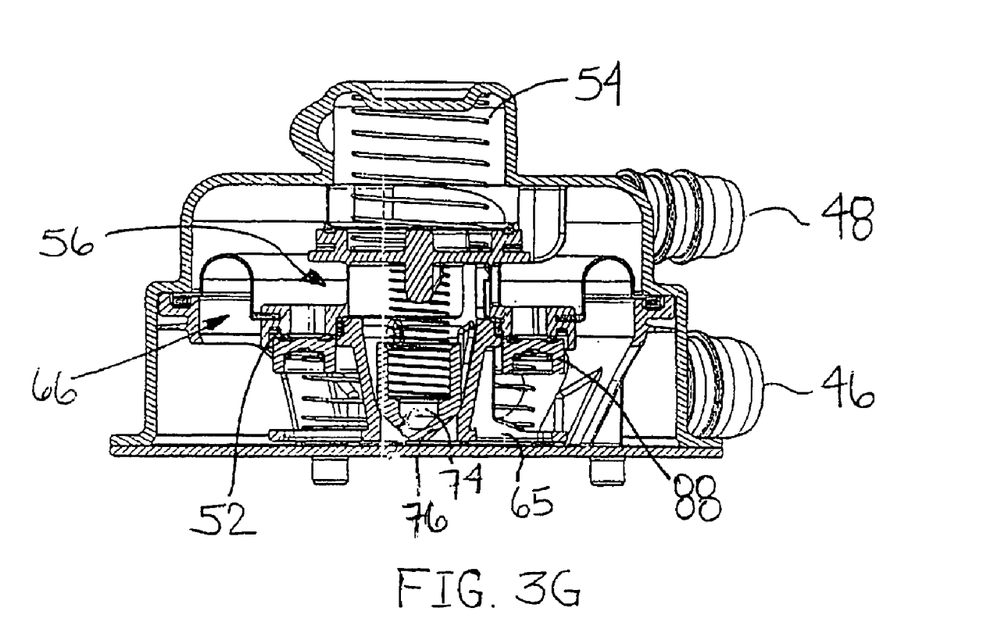
FIG. 3G is a partial cut away side sectional view along sectional axis B—B of the fuel tank isolation valve of FIG. 3A in an open position.
Figure 3H:
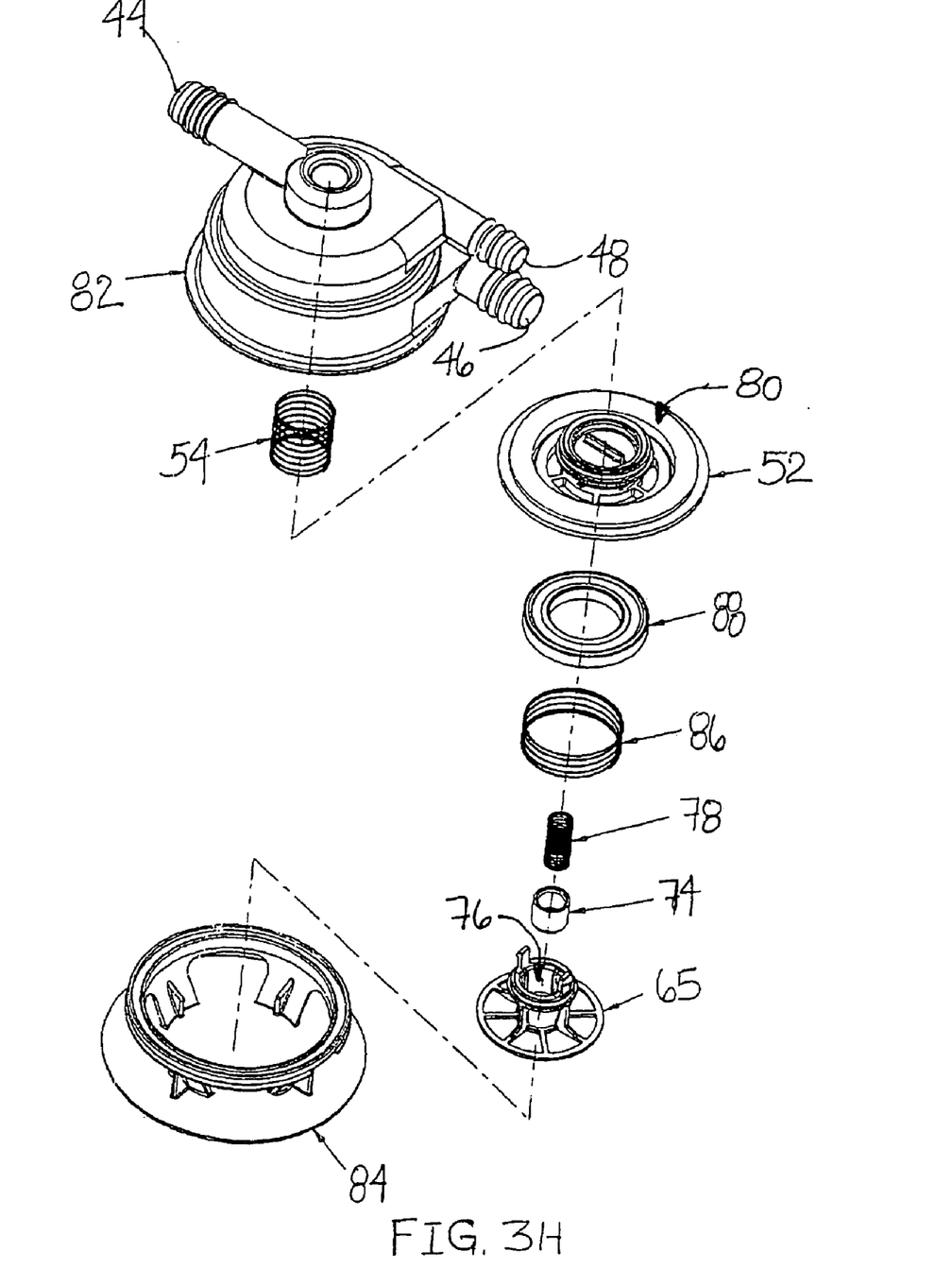
FIG. 3H is an exploded assembly view of the fuel tank isolation valve of FIG. 3A.

Further detail of the interior of fuel tank isolation valve 20 of FIGS. 3A–3C is illustrated in FIGS. 3D–3H. Included therein is diaphragm 52 for closing a normally open internal pathway to occlude fluid communication between first port 44 and second port 46 in response to a purge event and further to prevent fluid flow between first port 44 and third port 48 under circumstances described further below. At the start of and between individual purges of hydrocarbon vapors from an associated canister 22, diaphragm 52 is positioned in cooperation with diaphragm spring 54 such that diaphragm 52 does not occlude vapor pathway 56 between canister 22 and fuel tank 24 via first and second ports 44 and 46 and through respective conduits 62 and 60 as shown in FIGS. 3D, 3F, and 3G. Diaphragm 52 is designed so that it does not move from this normally open position (which movement could cause physical adjustment and possible occlusion of the internal vapor pathway) until a selected threshold pressure differential is reached in an exemplary embodiment of the invention.

With particular reference to FIG. 3D, at the start of a canister 22 purge, a pressure differential develops across diaphragm 52 due to purge flow. Once this differential pressure reaches the threshold pressure differential, diaphragm 52 moves to fluidly isolate fuel tank 24 from canister 22 by contact of seat 63 and seal 64 within isolation valve. Thus, the pressure differential created at the start of a canister 22 purge increases rapidly and causes diaphragm 52 to reposition itself when a threshold pressure differential is reached such that normally open vapor pathway 56 (shown open in FIGS. 3D and 3F-3G), which is situated within isolation valve between canister 22 and fuel tank 24, closes as shown in FIG. 3E.

Movement of diaphragm 52 in this manner results in closure of first port 44 to fuel tank 24. Once first port 44 to fuel tank 24 is closed in this manner, further increased purge flow from canister 22 to engine purge control valve 38 causes a larger pressure drop across canister 22 and engine purge control valve 26. Efficient and effective purging of canister 22 is thus enabled. Because first port 44 to fuel tank 24 was closed previously, fuel tank 24 will not be exposed to the larger differential pressure in chamber 56 once diaphragm 52 closes due to movement of seal 64 against seat 63. Therefore, purging of canister 22 will not result in hydrocarbon vapors being unnecessarily drawn from within fuel tank 24.

In order to facilitate desired movement of diaphragm 52, diaphragm spring 54 is positioned above diaphragm 52 extending into port 44, which leads to fuel tank 24. In an exemplary embodiment, diaphragm spring 54 is a compression spring.

As noted above, once the threshold pressure differential is reached at the beginning of a purge event, normally open vapor pathway 56 within isolation valve between canister 22 and fuel tank 24 closes due to movement of diaphragm 52 in a first longitudinal direction (e.g., upward toward fuel tank 24 side of diaphragm 52 with respect to positioning within a final valve assembly) by a generally fixed amount to a "closed" position. Diaphragm 52 remains in that position until the pressure differential across the diaphragm 52 falls below the threshold pressure differential level (e.g., in response to engine purge control valve 38 discontinuing further purging of canister 22), at which time diaphragm 52 returns to its previous position by moving in a second longitudinal direction (e.g., downward toward canister 22 side of diaphragm 52 with respect to positioning within a final valve assembly), to an "open" position opposite to the first direction, by the same generally fixed amount. For a light passenger truck or car engine, which is typically anywhere from a four-cylinder to a V8 engine, the fixed amount is approximately $3/16$ inch. It is to be understood, however, that this fixed amount can vary depending on overall system design and its intended application.

Contributing to creation and control of the pressure differential across diaphragm 52 during a purge event is a flow sensitive pressure device such as, e.g., head valve 65, which is a preferred subcomponent of fuel tank isolation valves of the invention. Once a threshold pressure differential level develops across diaphragm 52, this preferred type of flow sensitive pressure device (i.e., head valve 65) provides relief from a further substantial increase in pressure differential across diaphragm 52 by opening accordingly.

With reference to FIG. 3D, head valve 65 operates to create and control the pressure differential between chambers 66 and 68 on opposing sides (i.e., canister 22 and fuel tank 24 respectively) of diaphragm 52 within fuel tank isolation valve 20. When diaphragm 52 is moved into a closed position once a threshold pressure differential between chambers 66 and 68 and across diaphragm 52 is reached, fuel tank 24 becomes fluidly isolated from canister 22. The force causing diaphragm 52 to move upward is the net force resulting from pressures on opposite sides of diaphragm 52. The magnitude of upward pressure against diaphragm 52 triggered by this purge flow and its rate of increase when a purge event is initiated is controlled by head valve 65 in an exemplary embodiment of the invention.

Figure 4:
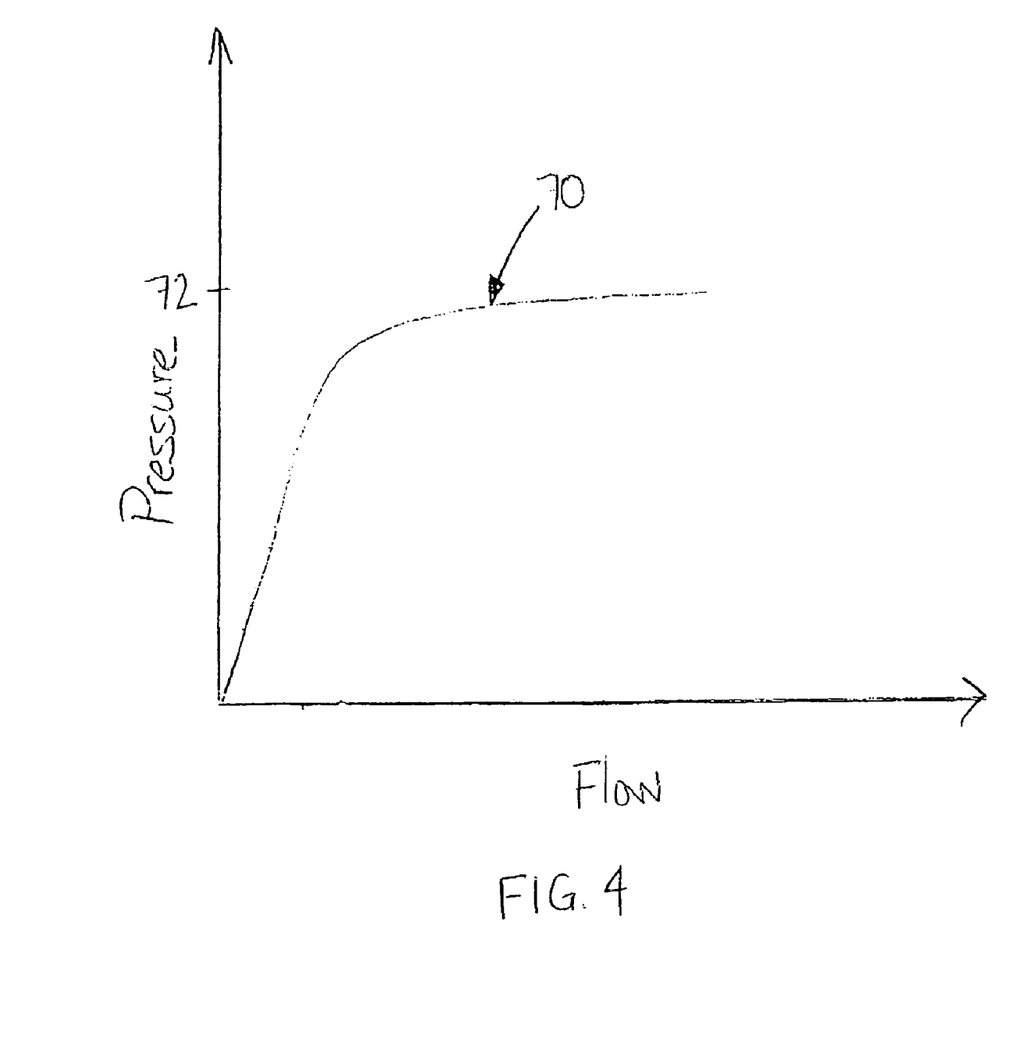
FIG. 4 is a graphical representation of purge flow versus fuel tank isolation valve diaphragm pressure in an exemplary embodiment of the invention.

FIG. 4 graphically illustrates how upward pressure against diaphragm 52 in chamber 66 relates to magnitude of purge flow through head valve 65 in such an embodiment. With increasing initial purge flow, line 70 representing this relationship is essentially linear with pressure increasing at a relatively rapid and steady rate. During this stage, head valve 65 is closed. The rapid increase in pressure allows for upward movement of diaphragm 52 in order to fluidly isolate fuel tank 24 from canister 22 during a purge event. Such upward movement is possible, even at low purge flow rates. Once the threshold pressure differential is reached, head valve 65 opens to relieve upward pressure against diaphragm 52. After the threshold pressure differential is reached and head valve 65 so opens, further increase in pressure is minimized. In this manner, a pressure differential approximating the threshold pressure differential is maintained across diaphragm 52. Associated with this pressure differential is an essentially constant upward force against diaphragm 52. Maintenance of this comparatively constant upward force for the duration of a purge allows for effective and efficient purge of canister 22 and effective operation of fuel tank 24 overpressure relief components, which are discussed further below.

The threshold pressure 72 illustrated in FIG. 4 varies according to the overall system within which the isolation valve is employed. Further, isolation valves are generally designed such that threshold pressure 72 depends on the intended application for the valve. In a particularly useful embodiment of the invention, that where the isolation valve comprises a fuel tank isolation valve for light passenger trucks or cars, the threshold pressure 72 is approximately 2 to approximately 4 inches of atmospheric water in association with a typical purge flow rate of approximately 2 liters per minute (lpm). However, the fuel tank isolation valve should operate effectively in conjunction with a wide range of purge flow rates (e.g., up to approximately 70 lpm or even to approximately 100 lpm), with the threshold pressure 72 remaining essentially constant during operation no matter what purge flow rate the fuel tank isolation valve is subjected to.

In an exemplary embodiment, as shown in FIG. 3D to FIG. 3H, head valve 65 comprises a spring-loaded pin 74 operating in conjunction with an orifice 76 terminating in, for example, a lower portion having a tapered or cone shape. In an exemplary embodiment, spring 78 for pin 74 is a compression spring. As pin 74 travels upward within lower portion of orifice 76, the effective diameter of the orifice 76 changes due to the non-planar shape of the orifice's lower surface. According to the embodiment illustrated, where sides of tapered lower surface of orifice 76 have an essentially constant slope, the effective diameter of orifice 76 changes in an essentially linear manner when pin 74 moves upward through lower portion of orifice 76. Upward movement of pin 74 in this manner provides a bypass for further purge flow during a purge event. Operation of head valve 65 in this manner minimizes exertion of additional upward force against diaphragm 52 once the threshold pressure differential is obtained. As understood by those of ordinary skill in the art of such valves, dimensions of pressure sensitive flow devices such as head valve 65 and subcomponents thereof will vary depending on flow rates to which it is subjected and pressure differentials so regulated that are tolerable or desired.

When fuel tank 24 is isolated according to the invention, seal 64 on upper end 80 of closed diaphragm 52, which is flanged in an exemplary embodiment of the invention, firmly abuts with seat 63 on upper valve housing 82 to form a sealed interface. Any suitable materials and designs can be used to provide the sealed interface. For example, the sealed interface is a plastic-to-plastic seal in one embodiment. In an exemplary embodiment, one suited well for fuel-related applications, the sealed interface comprises a rubber seal. According to the exemplary embodiment illustrated throughout and with particular reference to FIG. 3H, upper valve housing 82 fixedly joins with a lid 84 or similar component to enclose integral components into a final assembly.

As illustrated in FIG. 2, in order to maintain a desirable pressure within fuel tank 24, a tank pressure sensor is often used to detect pressures in excess of a predetermined fuel tank 24 pressure. While additional tank pressure sensors can be used, they are not necessary in further embodiments of the invention. The pressure desired within fuel tank 24 depends on the overall construction of the fuel vapor emission control system and its application. In many exemplary embodiments, the vapor dome pressure is maintained at a level of approximately 10 inches atmospheric water or less.

Maintenance of this vapor dome pressure is even required in certain applications of the invention.

Vapor dome pressure generally increases substantially during a refueling event. Thus, according to a further embodiment of the invention, a pressure sensor within fuel tank 24 is utilized to send a signal to an operatively connected ECU 30 when a refueling event is sensed (i.e., based on an associated rapid rise in fuel tank pressure). This signal prompts ECU 30 to send a signal to other components within the fuel tank emission control system instructing a purge event to stop so that rich hydrocarbon vapors from the refueling event do not flow to the engine at an undesired rate.

In addition, vapor dome pressure can also increase to undesirable levels due to temperature fluctuations and sloshing of fuel within fuel tank 24. Generally, any increase in vapor dome pressure from these causes is significantly less rapid than that associated with a refueling event. Thus, the pressure sensor does not generally signal the purge event to stop in those instances, as it would when a rapid rise in vapor dome pressure is sensed during a refueling event.

If reduction of fuel tank 24 pressure is desired (e.g., relief of overpressure developed within fuel tank 24), exemplary fuel tank isolation valves of the invention allow for such reduction. Advantageously, fuel tank 24 overpressure is relieved with essentially no venting of hydrocarbon vapors to the atmosphere. For example, excess pressure within fuel tank 24 (e.g., such as that generated due to temperature fluctuations and/or sloshing) can be relieved effectively and efficiently by providing an overpressure relief spring 86 and corresponding overpressure relief ring 88 in an exemplary fuel tank isolation valve as illustrated throughout FIG. 3D through FIG. 3H.

According to this embodiment, an internal fluid pathway from fuel tank 24 to canister 22 and from canister 22 to engine purge control valve 38 is normally closed by a seal formed by the overpressure relief ring 88. When fuel tank 24 pressure is maintained at a desirable level, this fluid pathway is closed irrespective of whether diaphragm 52 has moved to occlude the normally open internal pathway 56 within the isolation valve. Yet, the seal formed by the overpressure relief ring 88 is minimal. The seal is typically broken when subjected to a pressure differential of less than approximately one inch atmospheric water pressure in an exemplary embodiment. The pressure differential at which the seal breaks and overpressure relief ring 88 "opens" is referred to at the overpressure relief point.

Overpressure relief ring 88 is capable of moving downward (to an "open" position) between purge events when diaphragm 52 is otherwise positioned to allow fluid communication between fuel tank 24 and canister 22 when, for example, venting of excess pressure from within fuel tank 24 to canister 22 is desired. That is, between purges excess fuel tank 24 pressure is relieved through overpressure relief ring 88 opening as needed to provide fluid communication between fuel tank 24 and canister 22. In this manner, fuel tank 24 is able to vent what is generally a relatively small amount of excess hydrocarbon vapors to canister 22 when desired fuel tank pressures are exceeded between purges. Such hydrocarbon vapors are then stored in canister 22 until a purge event, which causes the stored hydrocarbon vapors to be transported to engine 10 via engine purge control valve 38.

Despite normal closure of diaphragm 52 during a purge event, overpressure relief can nevertheless still occur effectively during a purge event according to this embodiment of the invention. During a purge event, upward force against diaphragm 52 is overcome by a downward force exerted thereon resulting from an increased pressure differential between the fuel tank and the purge cavity upon accumulation of excess pressure within the fuel tank. Note that during a purge vent, as illustrated in FIG. 4, once a threshold pressure 72 is reached, the pressure differential across diaphragm 52 increases only slightly with increasing purge flow rate—in an amount that is just enough to offset the increased downward force against diaphragm 52 which is generated by the pressure differential between the tank and purge cavity. Hence, essentially the same opening pressure for the fuel tank (i.e., relief pressure) is maintained during a purge event. Essentially the same relief pressure is maintained during a purge event no matter what the purge flow rate. In this manner, fuel tank 24 is able to vent what is generally a relatively small amount of excess hydrocarbon vapors to engine purge control valve 38 when desired fuel tank pressures are exceeded during a purge. When more rapid relief of overpressure within fuel tank 24 is desired (i.e., more rapid than that afforded by venting of excess pressure to engine purge control valve 38 alone), overpressure relief ring 88 opens to also allow venting of excess pressure to canister 22. From canister 22, such hydrocarbon vapors are transported to engine 10 via engine purge control valve 38.

In a further embodiment of the invention, a pressure decay leak check is included with fuel vapor emission control systems of the invention. Fuel tank isolation valves of the invention are capable of operating effectively in conjunction with conventional pressure decay leak check mechanisms, as well as many other desirable components within fuel tank emission control systems and larger assemblies. For example, during a pressure decay leak check, fuel tank isolation valves of the invention are able to equalize pressure between chambers on opposite sides of the diaphragm at an adequate rate so as not to fail the pressure decay leak check test.

Isolation valves of the invention are fabricated from any suitable materials and components. Ideally, materials are selected to withstand environmental operating conditions, which can include a variety of liquids such as fuel, coolant, lubricants (e.g., transmission oil), and water. In an exemplary embodiment, isolation valves are constructed from materials and components to enable the valves to operate effectively despite their orientation within the fuel vapor emission control system. In an exemplary embodiment, an isolation valve of the invention can be constructed so that it provides essentially the same function whether it is positioned upright or sideways within a larger assembly. For example, the use of a spring in operable connection with pressure sensitive flow devices therein, as opposed to use of gravitational forces, is one way in which this desirable trait is achieved.

Advantageously, fuel tank isolation valves of the invention facilitate reduced cost and weight as compared to valves that operate based on electrical actuation. For example, costs and weight can be reduced more than approximately 75% each. Thus, not only do such valves provide for efficient and effective purging of hydrocarbon vapors from canisters during operation of associated engines, but they provide physical improvements notwithstanding those functional improvements associated with operation.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

The invention claimed is:

1. A mechanically actuated isolation valve, comprising:
   a first port in fluid communication with a first component;
   a second port in fluid communication with a second component;
   a third port in fluid communication with a third component;
   a diaphragm disposed within the valve for closing a normally open internal pathway to occlude fluid communication between the first port and the second port and allow fluid flow from the second component to the third component in response to a pressure differential across the diaphragm; and
   a flow sensitive pressure device for controlling the pressure differential across the diaphragm.

2. The mechanically actuated isolation valve of claim 1, wherein the fluid comprises fuel and the valve comprises a fuel tank isolation valve.

3. The mechanically actuated isolation valve of claim 1, wherein essentially the same pressure differential is maintained across the diaphragm irrespective of rate of fluid flow from the second component to the third component, and wherein fluid flow between the first component and the third component is prevented upon closing of the normally open internal pathway so long as pressure within the first component is less than the pressure differential across the diaphragm.

4. The mechanically actuated isolation valve of claim 1, wherein the pressure differential across the diaphragm is controlled to a relatively constant level of approximately two to approximately four inches of atmospheric water pressure with increasing fluid flow from the second component to the third component after closing of the normally open internal pathway.

5. The mechanically actuated isolation valve of claim 1, wherein the valve is capable of purging a hydrocarbon canister in a fuel tank emission control system while simultaneously isolating a fuel tank fluidly coupled thereto without reliance on reliable operation of electronic components therein.

6. The mechanically actuated isolation valve of claim 1, wherein the first component comprises a fuel tank.

7. The mechanically actuated isolation valve of claim 1, wherein the second component comprises a canister for storage of hydrocarbon vapor.

8. The mechanically actuated isolation valve of claim 1, wherein the third component comprises an engine purge control valve.

9. The mechanically actuated isolation valve of claim 1, wherein the diaphragm closes the normally open internal pathway in response to a pressure differential of approximately two to approximately four inches atmospheric water pressure.

10. The mechanically actuated isolation valve of claim 1, further comprising an overpressure relief ring and an associated overpressure relief spring.

11. The mechanically actuated isolation valve of claim 10, wherein the isolation valve operates to maintain pressure within the first component to approximately ten inches atmospheric water pressure or less.

12. The mechanically actuated isolation valve of claim 10, wherein when fluid flows from the second component to the third component upon closing of the normally open internal pathway, a relief pressure associated with the first component is essentially the same irrespective of rate of fluid flow from the second component to the third component.

13. The mechanically actuated isolation valve of claim 1, wherein the diaphragm closes the normally open internal pathway by moving longitudinally in a first direction by approximately 3/16 inch.

14. The mechanically actuated isolation valve of claim 1, wherein fluid flows from the second component to the third component at a rate of up to approximately 100 lpm.

15. The mechanically actuated isolation valve of claim 1, wherein the valve provides essentially the same function whether it is positioned upright or sideways within a larger assembly.

16. An isolation valve adapted for use in a fuel tank emission control system, wherein the valve comprises:
    a first port for fluid communication with a fuel tank;
    a second port for fluid communication with a canister for storage of hydrocarbon vapor received from the fuel tank;
    a third port for fluid communication with an engine purge control valve for delivery of purged hydrocarbon vapors from the canister to the engine for internal combustion therein;
    a diaphragm disposed within the valve for closing a normally open internal pathway to occlude fluid communication between the first port and the second port and allow flow of hydrocarbon vapor from the second port to the third port in response to a pressure differential across the diaphragm; and
    a flow sensitive pressure device for controlling the pressure differential across the diaphragm,
    wherein essentially the same pressure differential is maintained across the diaphragm irrespective of rate of purge flow from the canister to the engine purge control valve, and wherein fluid flow between the fuel tank and the engine purge control valve is prevented upon closing of the normally open internal pathway so long as pressure within the fuel tank is less than the pressure differential across the diaphragm.

17. The isolation valve of claim 16, wherein the pressure differential across the diaphragm is controlled to a relatively constant level of approximately two to approximately four inches of atmospheric water pressure with increasing hydrocarbon vapor flow from the canister to the engine purge control valve after closing of the normally open internal pathway.

18. The isolation valve of claim 16, wherein the valve is capable of purging hydrocarbon vapor from the canister while simultaneously isolating the fuel tank without reliance on reliable operation of electronic components therein.

19. The isolation valve of claim 16, wherein the diaphragm closes the normally open internal pathway in response to a pressure differential of approximately two to approximately four inches atmospheric water pressure.

20. The isolation valve of claim 16, further comprising an overpressure relief ring and an associated overpressure relief spring.

21. The isolation valve of claim 20, wherein pressure is maintained within the fuel tank to approximately ten inches atmospheric water pressure or less.

22. The isolation valve of claim 20, wherein during a purge event a relief pressure associated with the fuel tank is essentially the same irrespective of rate of purge flow from the canister to the engine purge control valve.

23. The isolation valve of claim 16, wherein the diaphragm closes the normally open internal pathway by moving longitudinally in a first direction by approximately ³⁄₁₆ inch.

24. The isolation valve of claim 16, wherein hydrocarbon vapor is capable of flowing from the canister to the engine purge control valve at a purge flow rate of up to approximately 100 lpm.

25. The isolation valve of claim 16, wherein the valve provides essentially the same function whether it is positioned upright or sideways within a larger assembly.

26. A fuel tank emission control system comprising the isolation valve of claim 16 fluidly coupled between a fuel tank, canister, and engine purge control valve therein.

27. A gasoline-powered vehicle comprising the fuel tank emission control system of claim 26.

28. The gasoline-powered vehicle of claim 27, wherein the vehicle comprises a passenger car.

29. The gasoline-powered vehicle of claim 27, wherein the vehicle comprises a light passenger truck.

30. A method of isolating a fuel tank from a canister within a fuel tank emission control system, the method comprising:
   providing a mechanically actuated isolation valve in fluid communication with the fuel tank and the canister:
   initiating purge of the canister, thereby fluidly isolating the fuel tank from the canister by actuating the mechanically actuated isolation valve.

31. The method of claim 30, wherein the mechanically actuated isolation valve comprises:
   a first port for fluid communication with the fuel tank:
   a second port for fluid communication with the canister for storage of hydro received from the fuel tank:
   a third port for fluid communication with an engine purge control valve for delivery of purged hydrocarbon vapors from the canister to the engine for internal combustion therein:
   a diaphragm disposed within the valve for closing a normally open internal pathway to occlude fluid communication between the first port and the second port and allow flow of hydrocarbon vapor from the second port to the third port in response to a pressure differential across the diaphragm; and
   a head valve for controlling the pressure differential across the diaphragm,
   wherein essentially the same pressure differential is maintained across the diaphragm irrespective of rate of purge flow from the canister to the engine purge control valve, and
   wherein fluid flow between the fuel tank and the engine purge control valve is prevented upon closing of the normally open internal pathway so long as pressure within the fuel tank is less than the pressure differential across the diaphragm.

32. The method of claim 30, wherein the mechanically actuated isolation valve maintains pressure within the fuel tank to approximately ten inches atmospheric water pressure or less.

33. The method of claim 30, wherein the mechanically actuated isolation valve comprises a diaphragm and a flow sensitive pressure device.

34. The method of claim 30, wherein an essentially constant pressure differential is maintained across the diaphragm during the purge.

35. The method of claim 30, wherein the mechanically actuated isolation valve comprises an overpressure relief ring and an associated overpressure relief spring.

\* \* \* \* \*

UNITED STATES PATENT AND TRADEMARK OFFICE
CERTIFICATE OF CORRECTION

PATENT NO. : 7,107,971 B2 Page 1 of 1
APPLICATION NO. : 10/966437
DATED : September 19, 2006
INVENTOR(S) : Spink et al.

It is certified that error appears in the above-identified patent and that said Letters Patent is hereby corrected as shown below:

Col. 13
In Claim 31, line 33, "hydro" should read --hydrocarbon vapor--.

Signed and Sealed this

Thirteenth Day of February, 2007

JON W. DUDAS
*Director of the United States Patent and Trademark Office*